(12) United States Patent
Kaneeda et al.

(10) Patent No.: US 7,772,149 B2
(45) Date of Patent: Aug. 10, 2010

(54) EXHAUST GAS PURIFICATION APPARATUS FOR AN INTERNAL COMBUSTION ENGINE AND A CATALYST FOR PURIFYING EXHAUST GAS

(75) Inventors: Masato Kaneeda, Hitachinaka (JP); Hidehiro Iizuka, Mito (JP); Norihiro Shinotsuka, Hikone (JP); Masahiro Sakanushi, Wako (JP); Kimihiro Tokushima, Wako (JP); Hiroki Hosoe, Wako (JP); Masayuki Kasuya, Isshiki (JP); Toshio Iwasaki, Nagoya (JP); Shogo Konya, Kimitsu (JP)

(73) Assignees: Hitachi, Ltd., Tokyo (JP); Honda Motor Co., Ltd., Tokyo (JP); Nippon Steel Materials Co., Ltd., Tokyo (JP)

( * ) Notice: Subject to any disclaimer, the term of this patent is extended or adjusted under 35 U.S.C. 154(b) by 287 days.

(21) Appl. No.: 11/634,241

(22) Filed: Dec. 6, 2006

(65) Prior Publication Data

US 2007/0129244 A1 Jun. 7, 2007

(30) Foreign Application Priority Data

Dec. 7, 2005 (JP) ............................. 2005-353146

(51) Int. Cl.
*B01J 23/02* (2006.01)
*B01J 23/50* (2006.01)
*B01J 21/10* (2006.01)
*B01J 23/04* (2006.01)
*F01N 3/10* (2006.01)

(52) U.S. Cl. ................ 502/306; 502/305; 502/319; 502/340; 502/344; 502/347; 60/299; 60/302

(58) Field of Classification Search ............ 502/305, 502/306, 344, 319, 340, 347; 60/299, 302
See application file for complete search history.

(56) References Cited

U.S. PATENT DOCUMENTS 4,588,707 A * 5/1986 Domesle et al. ............ 502/225
4,601,999 A   7/1986 Retallick
4,742,038 A * 5/1988 Matsumoto ................ 502/303

(Continued)

FOREIGN PATENT DOCUMENTS

EP  1 112 774 A2  7/2001

(Continued)

OTHER PUBLICATIONS

Japanese Patent Office Action mailed on Oct. 27, 2009 for the corresponding Japanese Application No. 2005-353146.

(Continued)

*Primary Examiner*—Timothy C Vanoy
*Assistant Examiner*—Diana J Liao
(74) *Attorney, Agent, or Firm*—Crowell & Moring LLP

(57) ABSTRACT

A Cr trapping agent is disposed so that it contacts with constituting components of the substrate containing Cr. As the Cr trapping agent, an element or Ag is used, wherein the element is stronger in basicity than alkali metals or alkaline earth metals. Since the Cr trapping agent prevents transfer of Cr towards the alkali metals or alkaline earth metals, the reaction between Cr and alkali metals or alkaline earth metals is prevented.

21 Claims, 2 Drawing Sheets

ACTIVE ELEMENTS

| ACTIVE ELEMENTS | Li | Na | K | Rb | Cs | Mg | Ca | Sr | Ba |
|---|---|---|---|---|---|---|---|---|---|
| Li |  | × | × | × | × | O | O | × | × |
| Na | O |  | × | × | × | O | O | O | × |
| K  | O | O |  | × | × | O | O | O | O |
| Rb | O | O | O |  | × | O | O | O | O |
| Cs | O | O | O | O |  | O | O | O | O |
| Mg | × | × | × | × | × |  | × | × | × |
| Ca | × | × | × | × | × | O |  | × | × |
| Sr | O | × | × | × | × | O | O |  | × |
| Ba | O | O | × | × | × | O | O | O |  |

U.S. PATENT DOCUMENTS

| | | | |
|---|---|---|---|
| 2001/0044376 A1* | 11/2001 | Noda et al. | 502/206 |
| 2003/0083197 A1* | 5/2003 | Noda et al. | 502/344 |
| 2004/0043898 A1 | 3/2004 | Noda et al. | |
| 2009/0148357 A1 | 6/2009 | Kaneeda et al. | |

FOREIGN PATENT DOCUMENTS

| | | |
|---|---|---|
| EP | 1 360 989 A1 | 11/2003 |
| EP | 1 498 180 A2 | 1/2005 |
| FR | 2 867 093 A1 | 9/2005 |
| JP | 57-87837 A | 6/1982 |
| JP | 5-184926 A | 7/1993 |
| JP | 7-316746 A | 12/1995 |
| JP | 8-299808 A | 11/1996 |
| JP | 8-332394 A | 12/1996 |
| JP | 9-85093 A | 3/1997 |
| JP | 10-286461 A | 10/1998 |
| JP | 2001-246252 A | 9/2001 |
| JP | 2003-144926 A | 5/2003 |
| WO | WO 03/035256 A2 | 5/2003 |
| WO | WO 03/070368 A1 | 8/2003 |
| WO | WO 2006/001077 A1 | 5/2006 |
| WO | WO 2006/103781 A1 | 5/2006 |

OTHER PUBLICATIONS

European Search Report dated Apr. 2, 2007 (Four (4) Pages).

* cited by examiner

ACTIVE ELEMENTS

|    | Li | Na | K | Rb | Cs | Mg | Ca | Sr | Ba |
|----|----|----|---|----|----|----|----|----|----|
| Li |    | ×  | × | ×  | ×  | ○  | ○  | ×  | ×  |
| Na | ○  |    | × | ×  | ×  | ○  | ○  | ○  | ×  |
| K  | ○  | ○  |   | ×  | ×  | ○  | ○  | ○  | ○  |
| Rb | ○  | ○  | ○ |    | ×  | ○  | ○  | ○  | ○  |
| Cs | ○  | ○  | ○ | ○  |    | ○  | ○  | ○  | ○  |
| Mg | ×  | ×  | × | ×  | ×  |    | ×  | ×  | ×  |
| Ca | ×  | ×  | × | ×  | ×  | ○  |    | ×  | ×  |
| Sr | ○  | ×  | × | ×  | ×  | ○  | ○  |    | ×  |
| Ba | ○  | ○  | × | ×  | ×  | ○  | ○  | ○  |    |

ACTIVE ELEMENTS

EXHAUST GAS PURIFICATION APPARATUS FOR AN INTERNAL COMBUSTION ENGINE AND A CATALYST FOR PURIFYING EXHAUST GAS

CROSS REFERENCE TO RELATED APPLICATIONS

This application is related to U.S. patent application Ser. No. 11/909,760, filed Sep. 26, 2007, which is a U.S. National Phase application of PCT/JP05/006242, the disclosures of which are hereby incorporated by reference in their entirety.

CLAIM OF PRIORITY

The present application claims priority from Japanese Application Ser. No. 2005-353146, filed on Dec. 7, 2005, the content of which is incorporated by reference into this application.

DESCRIPTION OF THE INVENTION

1. Field of the Invention

The present invention relates to an exhaust gas purification apparatus for an internal combustion engine and a catalyst for purifying exhaust gas, and more particularly to an exhaust gas purification apparatus for an internal combustion engine and a catalyst for purifying exhaust gas, which are suitable for a lean burn engine.

2. Prior Art

Emission of harmful gases such as NOx, CO, HC, etc from an internal combustion engine of an automobile, etc is strictly controlled. On the other hand, there is a demand on an increase in fuel consumption saving. Under these circumstances, lean burn engines, which are operated under an air fuel ratio leaner than a stoichiometric air-fuel ratio have been spotlighted. In case of lean-burn engines, it is impossible to purify NOx with a three-way catalyst, NOx being generated during the operation under the lean air fuel ratio. Therefore, there have been proposed NOx purifying catalysts to which alkali metals or alkaline earth metals are added in addition to components for the three-way catalysts. (For example, refer to patent documents No. 1, 2)

In exhaust gas purification catalysts for internal combustion engines, catalytic active components are generally disposed on a surface of a substrate made of ceramics such as cordierite. However, in the NOx purification catalysts for lean burn combustion, the NOx trapping agent i.e. alkali metals or alkaline earth metals react with components of the substrate when the trapping agents are subjected to high temperatures for a long time period, which brings about cracks of the substrate or lowering of the catalytic activity.

In the patent document No. 1, there is disclosed that silica, which is a component of the ceramics and K as the catalytic active component react with each other or K invades into the ceramics to bring about the crack of the substrate or the lowering of catalytic activity. The document No. 1 proposes the use of metallic honeycomb substrate. The patent document No. 2 proposes a substrate made of non-silica materials in order to solve the above problems.

(Patent document No. 1) Japanese patent laid-open 10-286461 (Abstract)

(Patent document No. 2) Japanese patent laid-open 2001-246252 (Abstract)

Figures 1, 2:
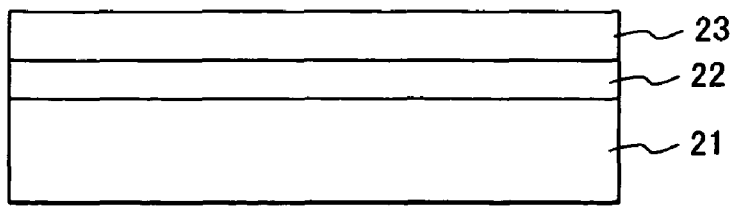
FIG. 1 is a drawing showing reactivity of alkali metals and alkaline earth metals with Cr.
FIG. 2 is a diagrammatic view of a catalyst having a Cr trapping layer between a substrate and a catalytic active component.

EXPLANATION OF REFERENCE NUMERALS 12 exhaust gas purification catalyst, 21 metal honeycomb substrate, 22 Cr trapping agent, 23 catalytic active component, 31 metal honeycomb substrate, 32 Cr . . . trapping agent, 33 - - - catalytic active component, 99 . . . engine.

SUMMARY OF THE INVENTION

The present inventors have investigated metal honeycomb substrates. As a result, the inventors have noticed that when the metal honeycomb substrates contain Cr, exhaust gas purification activity is greatly lowered if the substrates are subjected to aging treatment. They also found that the reaction between Cr in the metal honeycomb substrate and alkali metals or alkaline earth metals contained in the catalytic active components causes the above problems. The reaction between Cr and alkali metals or alkaline earth metals takes place as long as Cr is contained in not only metal honeycomb substrates but also other substrates.

It is an object of the present invention to provide an exhaust gas purification apparatus and an exhaust gas purification catalyst, whereby the reaction between the Cr in the substrate and alkali metals or alkaline earth metals in the catalytic active components is suppressed.

The present invention resides in that a Cr trapping agent is disposed in contact with components of the substrate. Concretely, the Cr trapping agent is disposed on a surface of the substrate or inside the substrate or inside the porous carrier supporting catalytic active components.

DETAILED DESCRIPTION OF THE INVENTION

As a Cr trapping agent, Ag or elements which are stronger in basicity strength than alkali metals or alkaline earth metals contained as catalytic active components are used in singly or in combination. Particularly, elements, which are positioned at right side in the order consisting of Mg, Ca, Li, Sr, Na, Ba, K, Rb and Cs than the alkali metals or alkaline earth metals contained as the catalytic active components are preferable.

According to the present invention, the transfer of Cr in the substrate towards the catalytic active components is prevented by the Cr trapping agent. As a result, cracks in the substrate or reduction in NOx purification performance, which are caused by reaction between Cr in the substrate and alkali metals or alkaline earth metals, are suppressed.

According to the embodiments of the present invention, it becomes possible to provide a NOx purification catalyst and an exhaust gas purification apparatus that hardly cause cracks of the substrate and reduction in NOx purification performance, even if aging treatment is applied to the catalyst.

DETAILED DESCRIPTION OF THE PREFERRED EMBODIMENTS

It is presumed that Cr in the metal honeycomb and the alkali metals or alkaline earth metals in the catalytic active components react with each other in accordance with the following mechanism. The metal honeycomb contains Fe, Al and/or Cr as constituting components, in general. When heat is imparted to the metal honeycomb, Al in the constituting components diffuses into the surface thereof to form a film of $Al_2O_3$. When alkali metals or alkaline earth metals are contained in the catalytic active components, these elements easily react with Cr; thus Cr also diffuses into the surface of the honeycomb and reacts with the alkali metals or alkaline earth metals to form compounds. Since the lean burn gas contains oxygen, composite oxides of Cr and alkali metals or Cr and alkaline earth metals are formed.

Generally, Cr easily reacts with alkali metals or alkaline earth metals in the presence of oxygen. For example, reaction between $K_2CO_3$ and Cr is explained. A thermodynamic calculation was conducted under the conditions that 1 mol of each of $K_2CO_3$, Cr, Al and Fe and 1 mol of $O_2$ are present at 800° C. A method of calculation was a thermal dynamics database MAL Windows Version (sold by Science Technologies Co.). As a result, all of Cr reacts with $K_2CO_3$ to form one mol of a composite oxide of K and Cr, i.e. $K_2CrO_4$. As is easily understood from the above-result, when K carbonate is in contact with Cr, Al, Fe, reaction with Cr proceeds preferentially. This mechanism can be applied to other alkali metals or alkaline earth metals. That is, alkali metals and alkaline earth metals easily react with Cr.

Accordingly, when alkali metals and alkaline earth metals are used as catalytically active components, they react with Cr under the presence of $O_2$ to form the composite oxides, which may deteriorate the catalyst.

An example is explained wherein a lean burn catalyst containing alkali metals as catalytic active component. In this case, at the time of the air fuel ratio being lean, the exhaust gas is brought into contact with a catalyst containing an alkali metal and a noble metal thereby to oxidize NO in the exhaust gas with the noble metal to NOx. The resulting NOx is trapped by an alkali metal. However, when Cr is present in the substrate, the alkali metal reacts with Cr, which leads to lowering the trapping ability of the alkali metal. Further, since a large amount of $O_2$ is present in the exhaust gas, reaction between the alkali metal and $O_2$ takes place easily. From the above, disposition of a Cr trapping agent in the catalyst is effective, whereby the reaction between Cr and alkali metal hardly occurs to suppress catalytic poisoning by Cr. As a Cr trapping agent, it is preferable to use ones that more easily react with Cr than alkali metals or alkaline earth metals in the catalyst used as active components.

A degree of chemical boning between Cr and alkali metals or alkaline earth metals under heating in the presence of oxygen was calculated by a thermodynamic method. The calculation method was the thermal dynamics database MAL Windows Version (sold by Science Technologies Co.). As a result, an order constituted by Mg, Ca, Ca, Li, Sr, Na, Ba, K, Rb and Cs was obtained. Elements positioned at right sides in the order tend to react with Cr more easily than other elements positioned not at right sides. It is presumed that the elements positioned at right sides are stronger in basicity strength than other elements and react with Cr.

From the above result, when K is used as a catalytic active element, Cs added as a Cr trapping agent may trap Cr even when Cr moves towards the catalytic active element from the substrate thereby to suppress poisoning of K by Cr.

Any elements that fall in the above order may be used in forms of carbonates, chlorides, nitrates, etc. The Cr trapping agent itself may form a protecting film; it may be dispersed in the porous carrier thereby to effectively use the trapping agent. As porous carriers, metal oxides or composite oxides such as alumina, titania, silica, silica-alumina, zirconia, magnesia, etc may be used. Among them, alumina is preferable because it is has excellent thermal resistance as well as a function for increasing dispersion performance of the Cr trapping agent. As the Cr trapping agent, Ag is suitable. Ag and Cr tend to form composite oxides in the presence of $O_2$ thereby to suppress poisoning of catalytic active elements such as alkali metals or alkaline earth metals by Cr. As the Cr trapping agent, Ag is suitable. Ag and Cr tend to form composite oxides in the presence of $O_2$ thereby to suppress poisoning of catalytic active elements such as alkali metals or alkaline earth metals by Cr.

A method of disposing the Cr trapping agent may be formed as layers between the substrate and the catalytic active elements. The Cr trapping agent that contains Cr trapping element may cover the whole surface of the substrate, it may be dispersed as dots or islands, which may exhibit Cr trapping performance.

A thickness of the Cr trapping agent may be freely determined; 10 to 200 micrometers is particularly preferable. If the thickness is less than 10 micrometers, Cr trapping performance becomes insufficient, and if the thickness is larger than 200 micrometers, cells of the honeycomb may be clogged.

The Cr trapping agent may be disposed inside the substrate. In this case, since Cr in the substrate maintains the state of Cr being trapped by the trapping agent, the transfer of Cr towards the catalytic active elements is effectively suppressed thereby to suppress poisoning of alkali metals or alkaline earth metals.

In case where the substrate is a metal substrate made of metal foil, it is preferable to use the Cr trapping agent in the form of metal. In the case of the metal substrate, if the Cr trapping agent is carbonates, chlorides, nitrates, etc, the substrate cannot keep its structure stably.

An amount of the Cr trapping agent may be determined in accordance with an amount of Cr in the substrate. In case where alkali metal or Ag is used as the Cr trapping agent, these elements react to form a composite oxide $M_2CrO_4$ (M; alkali metal or Ag) in accordance with the thermal dynamic calculation. Accordingly, in this case, the Cr trapping agent in an amount of 2 moles or more than an amount of Cr contained in the substrate may exhibit the Cr trapping performance. However, since all Cr trapping agents may not react with Cr, an amount of the Cr trapping agent is preferably three times the amount of Cr in contained the substrate.

When alkaline earth metals are used as the Cr trapping agent, these elements react with Cr to form composite oxides represented by $NCrO_4$ (N; alkaline earth metal) according to the thermal dynamic calculation. Accordingly, in this case, the Cr trapping agent in an amount of equal mole to an amount of Cr contained in the substrate may exhibit the Cr trapping performance. However, since all Cr trapping agents may not react with Cr, an amount of the Cr trapping agent is preferably two times the amount of Cr in contained the substrate.

The present invention may be applied to substrates that contain Cr. For example, there may be honeycomb structures made of iron-group alloy foils of Cr—Al—Fe alloys, Cr—Ni—Al—Fe alloys. Further, there are substrates made of alloys of Ti and Cr, alloys of Ti, Cr and Mg. Substrates other than metal substrates such as cordierite substrate to which Cr is added may be used.

The present invention may be applied to any of exhaust gas purification apparatuses using catalysts that contain at least one catalytic active component selected from the group consisting of alkali metals and alkaline earth metals and substrates containing Cr. Particularly, the present invention is useful for internal combustion engines whose air fuel ratio changes from a lean to rich or stoichiometric condition.

The present invention is also effective when noble metals are contained as catalytic active components. Particularly, the present invention is effective, when Rh, Pt and/or Pd are contained. If a catalyst that contains noble metals is in contact with the metal substrate and aging treatment of the substrate is applied, catalytic activity of the noble metal drastically is reduced. Although the reason of this phenomenon is not known, it is presumed that Cr diffused out to the catalytic layer may give some adverse affects on noble metals when the alkali metals or alkaline earth metals are combined with noble metals. Accordingly, it may be possible to suppress the adverse affects by Cr on the noble metals, when a film of the trapping agent is formed on the substrate to control the transfer of Cr towards the catalytic active components.

In case where the present invention is applied to a flow passage into which exhaust gas of a lean air fuel ratio or stoichiometric or rich air fuel ratio flows from the internal combustion engine, it is preferable that the NOx trapping component, NOx trapping components, noble metals and Mn are contained as catalytic active components. Further, the catalyst may preferably contain at least one NOx trapping agent selected from the group consisting of alkali metals and alkaline earth metals and at least one noble metal selected from the group consisting of Pt, Pd and Rh. The noble metals work as an oxidizing catalyst for NO at the time of lean burn and also work as a reducing catalyst for trapped NOx at the time of rich or stoichiometric operation. When Mn is contained, adsorption capability of NOx after heat treatment increases. This is because addition of Mn suppresses sintering of the alkali metals.

One of the alkali metals and alkaline earth metals may be used, but the use of two or more elements is more preferable to expand a NOx trapping temperature range. The temperatures at which NOx is trapped differ depending on elements used. Addition of two or three noble metals is more preferable than addition of one kind. Pt is particularly useful for oxidation reaction of NO, and Pd and Rh are particularly effective for reducing reaction of trapped NOx at the time of stoichiometric or rich operation.

Methods of preparing the exhaust gas purification catalysts are various chemical or physical preparation methods using impregnation, kneading, co-precipitation, sol-gel, ion-exchange, evaporation, etc. As starting materials, there are metals, metal oxides or various compounds such as nitrate compounds, acetate compounds, chelate compounds, hydroxide compounds, carbonate compounds, organic compounds, etc.

The catalytic active components may be directly disposed on the substrate or disposed on a surface of a porous carrier layer on the substrate. In case where the catalytic active components are supported on the porous carrier and then the supported catalyst is dispersed on the substrate, the high dispersion of the catalytic active components is expected thereby to increase the exhaust gas purification performance.

An amount of the porous carrier per one liter of the substrate is preferably 50 to 400 g, which gives an excellent NOx purification performance. If the amount of porous carrier is less than 50 g, function of the porous carrier is insufficient. If the supported amount is larger than 400 g, a surface area of the porous carrier decreases and may cause clogging of cell in case of the honeycomb substrate.

In the catalysts of the present invention, alkali metals such as Li, K, Cs, etc and alkaline earth metals such as Ca, Sr, Ba, etc may be present as metals or oxides.

A total supported amount of the alkali metals and alkaline earth metals as the catalytic active components should preferably be 0.25 to 2.0 mole parts in metal element conversion per 1.9 mole parts of the porous carrier. The "mol part" is used to mean concentration fractions of the respective components in mol number conversion. For example, 1.9 mol parts of A component to 2 mol parts of B component means that 2 of component B is supported per 1.9 of component A, regardless of an absolute amount of A. When the total supported amount of the alkali metals or the alkaline earth metals is less than 0.25 mol part, the catalytic activity by the alkali metals or alkaline earth metals is not sufficient. On the other hand, the total supported amount is larger than 2 mol parts, a specific surface area of the alkali metals and alkaline earth metals decreases, which is not preferable. Although the alkali metal to be supported may be K only, Na or Li may be supported in addition to K, which further increases catalytic activity. Combination of two or more of alkali metals may generate new catalytic active points. According to the technologies disclosed by the present invention, it is possible to reduce an amount of alkali metals and alkaline earth metals as the catalytic active components because the reaction between CR and the alkali metals or alkaline earth metals is suppressed thereby to control the poisoning by Cr.

A total supporting amount of Pt, Rh and Pd is 0.004 to 0.07 mol part per 1.9 mol parts of the porous carrier in metal element conversion. If the amount of the noble metal is smaller than 0.004 mol part, the catalytic activity increase by the noble 25 metal is insufficient. On the other hand, if the amount is larger than 0.07 mol part, a specific surface area of the noble metal decreases and increases a cost of the catalyst.

Shapes of the catalysts may be selected in accordance with applications. Honeycomb structures made of Cr containing alloy foils are provided with catalytic active components directly on thereon or honeycomb structures with coatings of porous carriers on the structures may be employed. Other structures such as pellets, plates, grains, powder, etc may be employed.

In the case of honeycomb structures, though the number of cell of 400 can exhibit sufficiently high NOx purification performance, 600 cells or more will give a high NOx purification performance. The larger the cell number, the geometric surface of the catalyst increases to increase a contact surface with the exhaust gas.

Cell structures may be triangles, rectangular, squares, circulars, etc. In the case of hexagons, highest purification performance may be expected. In the case of the hexagonal cells, catalytic active components located at the corners of the cells may effectively work.

Figure 4:
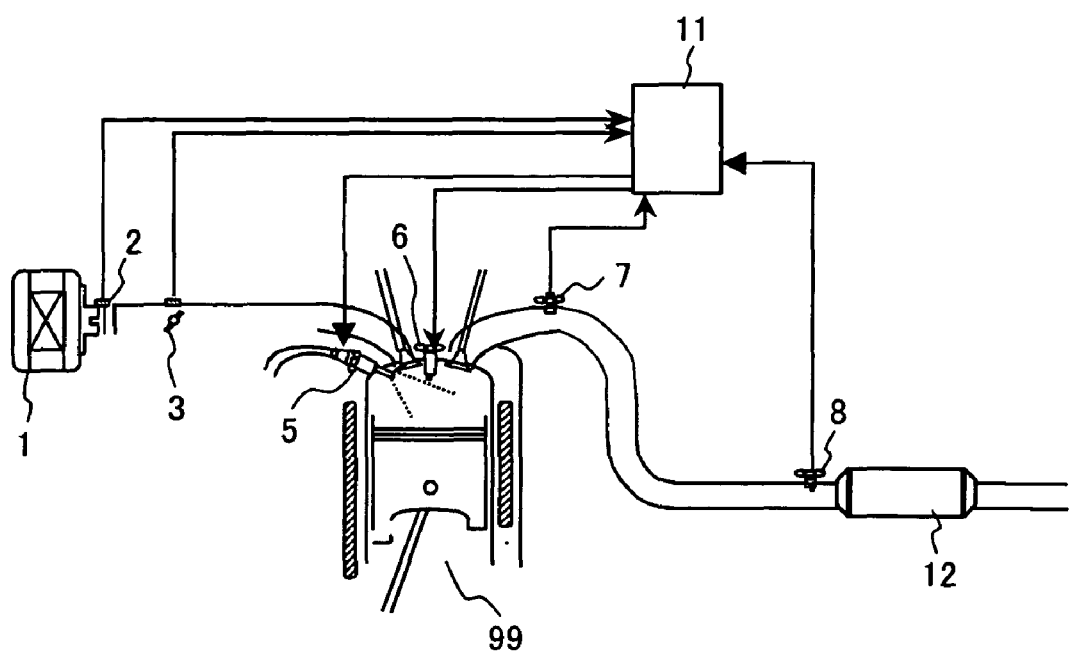
FIG. 4 is a diagrammatic view of an exhaust gas purification apparatus for an internal combustion engine according to one embodiment.

FIG. 4 shows an example of an exhaust gas purification apparatus having the exhaust gas purification catalyst according to the present invention disposed in an exhaust gas flow passage from an internal combustion engine. The exhaust gas purification apparatus of the present invention is provided with the exhaust gas purification catalyst 12 in the exhaust gas flow passage from the engine 99, which is capable of lean burn operation. An air fuel ratio of the exhaust gas introduced into the catalyst is controlled by control unit (hereinafter referred to as CPU) 11. An aspiration system of the internal combustion engine is provided with air-flow sensor 2 and throttle valve 3, etc and an exhaust gas system is provided with oxygen concentration sensor (A/F sensor) 7 and exhaust gas purification catalyst gas entrance temperature sensor 8 and the exhaust gas purification catalyst 12, etc. ECU is constituted by an I/O as output/input interface, an LSI, a calculation processing device, a RAM and a ROM for storing a large number of control programs and timer counter, etc.

The above-mentioned exhaust gas purification apparatus works as follows. After aspirated air into the engine is filtered by air-cleaner 1, its amount is measured by air flow sensor 2. Then, it goes through throttle valve 3 and receives fuel injection from injector 5 to form a mixed fuel gas, which is sent to engine 9. Air flow sensor signals and other sensor signals are input into ECU 11. ECU 11 determines an operation air-fuel ratio by evaluating operation conditions of the internal combustion engine and of the exhaust gas purification catalyst, and controls injection time, etc of injector 5 to set a predetermined value of a fuel concentration of the mixed fuel gas. The mixed fuel gas aspirated into the cylinder is ignited by ignition plug 6 with signals from ECU 11 thereby to combust the fuel gas.

Combusted exhaust gas is introduced into an exhaust gas purification system. An exhaust gas purification catalyst 12 for lean burn combustion is disposed in the exhaust gas purification system and at the time of stoichiometric operation a three-way catalyst purifies NOx, HC and CO in the exhaust gas. At the time of lean operation the catalyst purifies NOx by its NOx trapping function and at the same time it purifies HC and CO by its functions. ECU 11 always judges NOx purification capability of the exhaust gas purification catalyst at the lean operation and gives signals to switch the operation to stoichiometric or rich operation when the purification capability becomes insufficient. By this method, NOx purification capability can be recovered. According to the exhaust gas purification apparatus, it is possible to effectively reduce an emission of NOx from all of the internal combustion engines that conduct lean operation and stoichiometric or rich operation.

(Experiment 1: Investigation of Reactivity Between Cr and Alkali Metals or Alkaline Earth Metals)

Regarding the alkali metals and alkaline earth metals the reactivity between Cr and the elements was investigated.

What kinds of Cr salts are formed under coexistence of two compounds selected from carbonates of alkali metal and carbonates of alkaline earth metals, Cr and oxygen at 800° C. was calculated by using the thermal dynamics database MALT Windows.

The calculation results of the case are shown in FIG. 1 where an amount of metal elements contained in the alkali metal carbonates and alkaline earth metal carbonates were 0.4 mol, respectively, an amount of Cr was 0.01 mol and an amount of $O_2$ was 1 mol at 800° c.

FIG. 1 shows cases where the first elements first react with Cr shown as O and other cases as X, in the combinations of the first elements on the ordinate and second elements on the abscissa. The results indicate that if Na is contained in the catalytic active components, it is possible to prevent Cr to form a composite oxide with Na, when K, Rb, Cs and/or Ba, which are stronger in basicity than Na, is used as a Cr trapping agent. A composition of the composite oxide of alkali metals with Cr was $M_2CrO_4$ (M; alkali metal) and a composition of the composite oxide of alkaline earth metals with Cr other than Mg was $NCrO_4$ (N; alkaline earth metal). It is understood from FIG. 1 that the elements are reactive with Cr in the order of Mg, Ca, Li, Sr, Na, Ba, K, Rb and Cs.

Embodiment 1

Based on the results of the Experiment 1, a catalyst using K as a catalytic active component was prepared in the following manner. A solution of Cs nitrate was impregnated in alumina powder, which is a porous carrier, and the impregnate was dried at 150° C., followed by calcining it at 600° C. thereby to produce a Cr trapping agent powder A containing 2 moles of Cs in an element conversion per 1 mol of alumina.

Alumina powder was impregnated with a solution of dinitrosodianemine Pt nitrate, a solution of dinitrosodianemine Pd nitrate, a nitrate Rh solution and a mixed solution of sodium nitrate and potassium acetate. The impregnated was dried at 200° C., followed by calcinations at 600° C. for 1 hour thereby to produce a catalytic active component powder B comprising 12.4 g of Na, 15.6 g of K, 0.139 g of Rb, 2.792 g of Pt and 1.35 g of Pd in element conversion per 2 moles of alumina.

Then, A slurry prepared by adding nitric solution to the Cr trapping agent powder A was coated on a metal honeycomb substrate (400 cells/square inches) made of an alloy of 20 wt % of Cr—5 wt % of Al—the balance being iron. Thereafter, the coated honeycomb was dried at 200° C., followed by calcinations at 600° C. for 1 hour. As a result, a honeycomb having long of the Cr trapping agent powder A per 1 liter of the honeycomb was obtained.

An alkaline slurry prepared by adding ammonia water to the catalytic active powder B was coated on the honeycomb coated with the Cr trapping agent powder and dried at 200° C., followed by calcinations at 600° C. for 1 hour.

A diagrammatic view of the resulting catalyst of Embodiment 1, which was prepared in the above-mentioned method, is shown in FIG. 2. The catalyst has the Cr trapping agent layer 22 containing Cs in the alumina on the metal honeycomb substrate 21, and the catalytic active component 23 containing Na and K on the layer 22. It is possible to keep a high NOx purification performance. Since Cs is more reactive with Cr than Na and K and since Cs traps Cr, the catalytic active components Na and K are not poisoned by Cr, even if Cr in the metal honeycomb substrate moves towards the catalytic active components.

(Experiment 2: Advantage of the use of Ag)

Reactivity between Ag and Cr at 500° C. was investigated. Li was selected as alkali metal and a reaction product of Cr was calculated wherein there are 0.4 mol of Li carbonate, 0.2 mol of Ag, 0.1 mol of Cr, 1 mol of $O_2$—Calculation was carried out by using the thermal dynamics database MALT Windows. As a result, all of Cr reacted with Ag to form $Ag_2CrO_4$. From the results, it is apparent that poisoning of the alkali metals as the catalytic active components by Cr is prevented when Ag is utilized as the Cr trapping agent.

Embodiment 2

Figure 3:
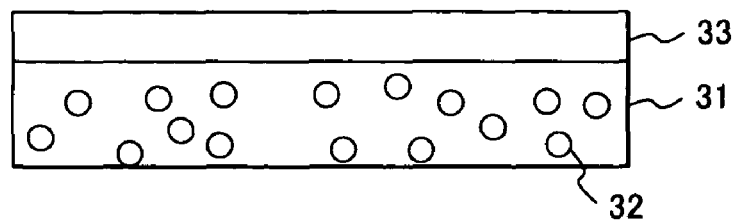
FIG. 3 is a diagrammatic view of a catalyst wherein the Cr trapping agent is present in the substrate.

A catalyst was prepared wherein the catalytic active component powder B was coated on a substrate that contains Cs as the Cr trapping agent therein. A diagrammatic view of the catalyst is shown in FIG. 3. Cs the Cr trapping agent 32 is present in the metal honeycomb substrate 31 made of Cr—Al—Fe alloy. The catalytic active component 33 containing Na and K is supported on the substrate. As the same as Embodiments, Cs traps Cr in the metal honeycomb substrate to prevent poisoning of Na and K, since Cs is more reactive with Cr than Na and K. As a result, the catalyst maintained high NOx purification performance.

What is claimed is:

1. An exhaust gas purification apparatus comprising an exhaust gas purification catalyst so disposed in an exhaust gas flow passage of an internal combustion engine that catalytically active components containing at least one member selected from the group consisting of alkali metals and alkaline earth metals is supported directly or by a porous carrier on the surface of a substrate containing Cr, wherein a Cr trapping agent containing at least one member selected from the group consisting of alkali metals and alkaline earth metals, the member having a higher reactivity with chromium than elements selected from the group consisting of the alkali metals and alkaline earth metals contained in the catalytically active components have with chromium contained in the substrate, is disposed in contact with components constituting the substrate.

2. The exhaust gas purification apparatus according to claim 1, wherein the Cr trapping agent is formed to cover the whole or part of the surface of the substrate.

3. The exhaust gas purification apparatus according to claim wherein the Cr trapping agent is formed in a layer on the surface of the substrate.

4. The exhaust gas purification apparatus according to claim 1, wherein the Cr trapping agent is present inside the substrate.

5. The exhaust gas purification apparatus according to claim 1, wherein the Cr trapping agent is present inside the porous carrier.

6. The exhaust gas purification apparatus according to claim 1, wherein the Cr trapping agent is constituted by an element, which is stronger in basicity strength than the alkali metals and the alkaline earth metals contained as the catalytic components in the catalyst.

7. The exhaust gas purification apparatus according to claim 1, wherein the Cr trapping agent is contained in the substrate in a molar amount two times or more of the amount of Cr contained in the substrate.

8. The exhaust gas purification apparatus according to claim 1, wherein the catalyst further contains noble metals as the catalytic active component.

9. The exhaust gas purification apparatus according to claim 1, wherein the catalyst contains at least one member selected from the group consisting of alkali metals and alkaline earth metals, at least one member selected from the group consisting of Rh, Pt and Pd, and Mn.

10. The exhaust gas purification apparatus according to claim 1, wherein the substrate is made of metal containing iron.

11. The exhaust gas purification apparatus according to claim 1, wherein the engine is a lean burn engine, and wherein when an air fuel ratio of the exhaust gas is lean, all or part of NOx contained in the exhaust gas is trapped by the alkali metal and the alkaline earth metals in the catalytic active components and when the air fuel ratio of the exhaust gas is rich or stoichiometric, the NOx trapped by the alkali metals and the alkaline earth metals is reduced with a reducing agent in the exhaust gas.

12. The exhaust gas purification apparatus according to claim 1, wherein the substrate is a metal honeycomb substrate.

13. An exhaust gas purification apparatus comprising an exhaust gas purification catalyst so disposed in an exhaust gas flow passage of an internal combustion engine that catalytically active components containing at least one member selected from the group consisting of alkali metals and alkaline earth metals is supported directly or by a porous carrier on the surface of a substrate that contains Cr, wherein a Cr trapping agent containing Ag is disposed in contact with components constituting the substrate.

14. A catalyst for purifying an exhaust gas from an internal combustion engine, which catalyst comprises catalytic active components selected from the group consisting of alkali metals and alkaline earth metals supported directly or by means of a porous carrier on a surface of a substrate containing Cr, wherein a Cr trapping agent containing at least one member selected from the group consisting of alkali metals and alkaline earth metals, the member having a higher reactivity with chromium contained in the substrate than that of the alkali metals and alkaline earth metals contained in the catalytically active components with the chromium is disposed in contact with constituting components of the substrate.

15. The catalyst according to claim 14, wherein all or part of the surface of the substrate is covered with the Cr trapping agent.

16. The catalyst according to claim 14, wherein the Cr trapping agent is formed in a layer on the surface of the substrate.

17. The catalyst according to claim 14, wherein the Cr trapping agent is present in the substrate.

18. The catalyst according to claim 14, wherein the Cr trapping agent is present in the porous carrier.

19. The catalyst according to claim 14, wherein the Cr trapping agent is constituted by elements stronger in basicity strength than that of the alkali metals and the alkaline earth metals contained in the catalytic active components.

20. The catalyst according to claim 14, wherein the substrate is a metal honeycomb substrate.

21. An exhaust gas purification apparatus comprising an exhaust gas flow passage of an internal combustion engine and an exhaust gas purification catalyst containing catalytically active components and at least one selected from the group consisting of alkali metals and alkaline earth metals, which is disposed in the passage, wherein the catalytically active components are directly supported or by means of a porous carrier on a substrate containing Cr, and silver as a Cr trapping agent is in contact with the substrate.

* * * * *